(12) United States Patent
Suzuki

(10) Patent No.: US 12,393,383 B2
(45) Date of Patent: Aug. 19, 2025

(54) INFORMATION PROCESSING APPARATUS, NON-TRANSITORY COMPUTER READABLE MEDIUM, AND INFORMATION PROCESSING METHOD FOR CREATING ADAPTED WORKFLOWS FOR EXTERNAL DEVICES

(71) Applicant: FUJIFILM Business Innovation Corp., Tokyo (JP)

(72) Inventor: Tatsuya Suzuki, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 716 days.

(21) Appl. No.: 17/541,221

(22) Filed: Dec. 2, 2021

(65) Prior Publication Data

US 2023/0042841 A1 Feb. 9, 2023

(30) Foreign Application Priority Data

Aug. 4, 2021 (JP) .................................. 2021-128165

(51) Int. Cl.
*G06F 3/12* (2006.01)

(52) U.S. Cl.
CPC .......... *G06F 3/1275* (2013.01); *G06F 3/1205* (2013.01); *G06F 3/1253* (2013.01); *G06F 3/1286* (2013.01); *G06F 3/1288* (2013.01)

(58) Field of Classification Search
None
See application file for complete search history.

(56) References Cited

U.S. PATENT DOCUMENTS

| 9,019,527 | B2 | 4/2015 | Omori | |
|---|---|---|---|---|
| 2003/0084016 | A1* | 5/2003 | Norgaard | G06Q 10/10 706/60 |
| 2008/0055646 | A1* | 3/2008 | Kawabata | G06Q 10/06 358/1.16 |
| 2011/0029977 | A1* | 2/2011 | Ramanathaiah | G06F 9/4881 718/102 |
| 2011/0043853 | A1* | 2/2011 | Omori | H04N 1/00949 358/1.15 |
| 2012/0287463 | A1* | 11/2012 | Lida | G06F 3/1205 358/1.15 |
| 2015/0215491 | A1* | 7/2015 | Faust | H04N 1/00517 715/780 |

(Continued)

FOREIGN PATENT DOCUMENTS

| CN | 102129610 A | * | 7/2011 |
|---|---|---|---|
| JP | 2011044946 | | 3/2011 |

(Continued)

OTHER PUBLICATIONS

"Office Action of Japan Counterpart Application", issued on Mar. 11, 2025, with English translation thereof, p. 1-p. 8.

*Primary Examiner* — Akwasi M Sarpong
*Assistant Examiner* — Pawan Dhingra
(74) *Attorney, Agent, or Firm* — JCIPRNET

(57) ABSTRACT

An information processing apparatus includes a processor configured to: display on a device a flow list of flows that each include a series of processes and that have already been created; and create a flow for the device by replacing a process in a flow selected from the flow list by a user using the device with a process corresponding to device information set for the device.

12 Claims, 6 Drawing Sheets

(56) References Cited

U.S. PATENT DOCUMENTS

| | | | |
|---|---|---|---|
| 2017/0003923 A1* | 1/2017 | Hane | H04N 1/00411 |
| 2017/0118169 A1* | 4/2017 | Boucadair | H04L 69/22 |
| 2019/0042170 A1* | 2/2019 | Yamada | G06F 3/1259 |
| 2019/0102222 A1* | 4/2019 | Giampetro | G06F 9/4881 |
| 2020/0220989 A1* | 7/2020 | Kato | H04N 1/00514 |
| 2020/0293253 A1* | 9/2020 | Kobashi | G06F 3/1264 |
| 2021/0048964 A1* | 2/2021 | Deleverio | G06F 3/1208 |

FOREIGN PATENT DOCUMENTS

| | | |
|---|---|---|
| JP | 2017175232 | 9/2017 |
| JP | 2020077902 | 5/2020 |
| JP | 2020107125 | 7/2020 |

\* cited by examiner

FIG. 2

| FLOW ID | FLOW NAME | PRIVILEGE INFORMATION | CONFIGURATION INFORMATION | | |
|---|---|---|---|---|---|
| | | | INPUT | PROCESSING | OUTPUT |
| F001 | NOISE REMOVAL PROCESS | U01, U04, ... | SCAN | NOISE REMOVAL | PRINT |
| F002 | DIAGRAM DIFFERENCE CHECK PROCESS | | READ | COMPARISON | PRINT |
| F003 | OCR PROCESS | | SCAN | CHARACTER RECOGNITION | FILE OUTPUT |
| ... | | | | | |

FIG. 3

| DEVICE ID | ADDRESS INFORMATION | FUNCTION INFORMATION | APPLICATION INFORMATION | USER INFORMATION |
|---|---|---|---|---|
| | | • PROVIDED FUNCTIONS | • INSTALLED APPLICATIONS | • USER ID<br>• USER NAME<br>• EMAIL ADDRESS |

INFORMATION PROCESSING APPARATUS, NON-TRANSITORY COMPUTER READABLE MEDIUM, AND INFORMATION PROCESSING METHOD FOR CREATING ADAPTED WORKFLOWS FOR EXTERNAL DEVICES

CROSS-REFERENCE TO RELATED APPLICATIONS

This application is based on and claims priority under 35 USC 119 from Japanese Patent Application No. 2021-128165 filed Aug. 4, 2021.

Background (i) Technical Field

The present disclosure relates to an information processing apparatus, a non-transitory computer readable medium, and an information processing method.

(ii) Related Art

In enterprises, people may create workflows to carry out operations. For example, a person may carry out a predetermined operation in accordance with a workflow that is a series of processes including input of a process target document, processing that is performed for the input document, and output of a processing result.

Workflows are basically registered in an intra-company multifunction machine or management server and used at the intra-company multifunction machine or from user terminals. Recently, remote work has been on the rise and there has been a demand for making workflows managed within a company executable from outside the company by using portable terminals.

Examples of the related art include Japanese Unexamined Patent Application Publication Nos. 2020-077902, 2017-175232, and 2011-044946.

SUMMARY

When a person tries to use an existing internal flow from an external device as is, a function used in the flow might not be installed in the externally used device. Therefore, a flow that is externally executable is to be created.

However, creation of the flow for the externally used device from scratch may involve substantial effort.

Aspects of non-limiting embodiments of the present disclosure relate to creating a flow that is adapted to an externally used device by using an already created flow more efficiently than in a case of creating the flow for the device from scratch.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to: display on a device a flow list of flows that each include a series of processes and that have already been created; and create a flow for the device by replacing a process in a flow selected from the flow list by a user using the device with a process corresponding to device information set for the device.

BRIEF DESCRIPTION OF THE DRAWINGS

An exemplary embodiment of the present disclosure will be described in detail based on the following figures, wherein:

FIG. 2 is a diagram illustrating an example data structure of flow information stored in a flow information storage unit in the present exemplary embodiment;

FIG. 3 is a diagram illustrating an example data structure of device information stored in a device information storage unit in the present exemplary embodiment;

DETAILED DESCRIPTION

Hereinafter, an exemplary embodiment of the present disclosure will be described with reference to the drawings.

Figure 1:
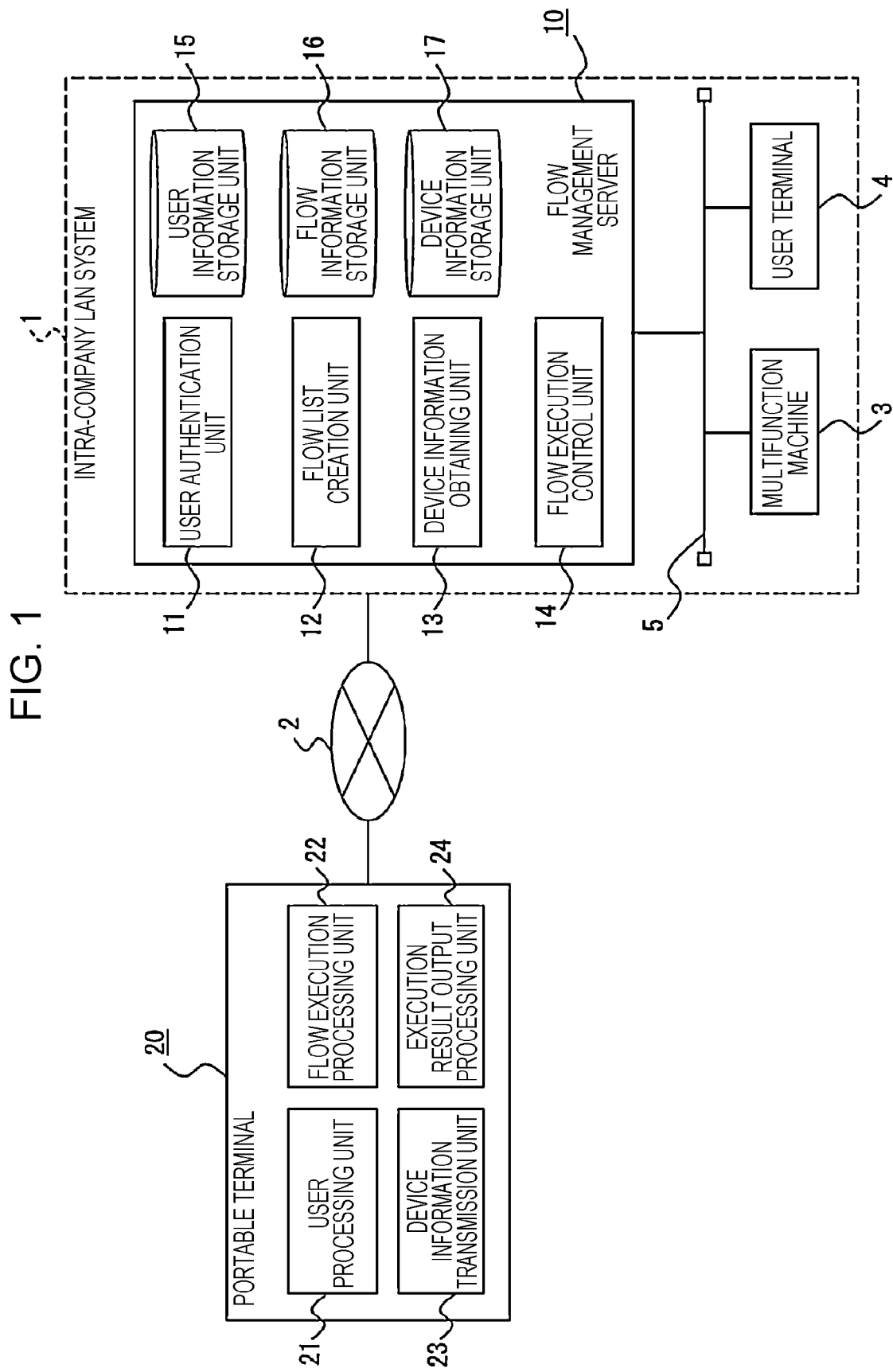
FIG. 1 is an overall configuration diagram illustrating a workflow system in the present exemplary embodiment.

FIG. 1 is an overall configuration diagram illustrating a workflow system in the present exemplary embodiment. The workflow system is a system constituted by an intra-company local area network (LAN) system 1 that is built within a company, such as an office of an enterprise, and a portable terminal 20 that is used outside the company connected to each other by a network 2, which is, for example, the Internet, to manage and execute workflows.

"Workflow" is also defined as an operation flow. Specifically, with a workflow, a series of processes is performed sequentially to thereby provide a predetermined operational process. When a process flow is called "flow", a workflow is an example of the flow. In the present exemplary embodiment, a workflow is assumed to be an example of the flow, and a description will be given. Therefore, "workflow" and "flow" are assumed to be synonymous with each other. Accordingly, "workflow" may be simply referred to as "flow".

"Outside the company" refers to a place that is outside the enterprise in which the intra-company LAN system 1 is built and that is a co-working space, a home of, for example, an employee of the enterprise, or the like. The intra-company LAN system 1 and the portable terminal 20 are connected to each other via, for example, a virtual private network (VPN) to thereby exchange data while safety in terms of security is ensured. The network environment for which safety is ensured is built by using an existing technique, and therefore, a description of the network connection will be omitted in the present exemplary embodiment.

The intra-company LAN system 1 is constituted by a flow management server 10, a multifunction machine 3, and a user terminal 4 connected to each other by a LAN 5. Although FIG. 1 illustrates only one multifunction machine 3 and one user terminal 4, plural multifunction machines 3 and plural user terminals 4 may be connected.

The multifunction machine 3 is an example of an image forming apparatus having various functions including a print function, a copy function, and a scanner function and is an apparatus that includes a computer. The multifunction machine 3 is a device that performs all or some of the process functions of workflows. The multifunction machine 3 in the present exemplary embodiment may be implemented as an existing general-purpose image forming apparatus. That is, the multifunction machine 3 includes hardware, such as a central processing unit (CPU), a read-only memory (ROM), a random access memory (RAM), an operation panel that serves as a user interface, a hard disk drive (HDD) that serves as a memory, a network interface that serves as a communication unit, a scanner, and a printer.

The user terminal 4 is an information processing apparatus that is used within the company by, for example, an employee of the enterprise (hereinafter referred to as "user"), and is implemented as an existing general-purpose hardware configuration of, for example, a personal computer (PC). That is, the user terminal 4 includes hardware, such as a CPU, a ROM, a RAM, a mouse, a keyboard, and a display that serve as a user interface, an HDD that serves as a memory, and a network interface that serves as a communication unit. The user terminal 4 is an example of a device that is used by a user who wants to use, within the company, workflows managed by the flow management server 10. The user terminal 4 taken out of the company and used may serve as the portable terminal 20.

The flow management server 10 is provided as an example of the information processing apparatus according to the exemplary embodiment of the present disclosure. The flow management server 10 may be implemented as a hardware configuration of an existing general-purpose server computer. That is, the flow management server 10 includes a CPU, a ROM, a RAM, an HDD that serves as a memory, and a network interface that serves as a communication unit.

The flow management server 10 manages workflows that are executed in the intra-company LAN system 1 and also executes workflows, for example, in cooperation with other devices including the multifunction machine 3. As illustrated in FIG. 1, the flow management server 10 includes a user authentication unit 11, a flow list creation unit 12, a device information obtaining unit 13, a flow execution control unit 14, a user information storage unit 15, a flow information storage unit 16, and a device information storage unit 17. Note that a constituent element not described in the present exemplary embodiment is omitted in FIG. 1.

The user authentication unit 11 performs user authentication in response to a login request from a user. As "user" in the present exemplary embodiment, an employee of the enterprise is assumed as described above. A user has an account for logging in to the flow management server 10. The flow list creation unit 12 creates, for a logged-in user, a list of workflows (also referred to as "flow list") available to the user. The device information obtaining unit 13 obtains information regarding the portable terminal 20 used by the logged-in user as device information. The flow execution control unit 14 controls execution of a workflow selected by the user from the flow list.

In the user information storage unit 15, personal information about a user having an account on the flow management server 10 is stored as user information. The user information includes a user ID that is typically used as a login ID, a password that is input at the time of login, a user name, and privileges granted to the user.

FIG. 2 is a diagram illustrating an example data structure of flow information stored in the flow information storage unit 16 in the present exemplary embodiment. The flow information is information regarding workflows managed by the flow management server 10. In the flow information, processes that constitute each workflow, the order in which the processes are performed, and so on are set. That is, in the flow information, a flow ID, a flow name, privilege information, and configuration information are set in association with one another for each workflow. The flow ID is identification information about the workflow. The flow name is the name of the workflow. As the privilege information, information regarding privileges to execute the workflow is set. With reference to the privilege information, it is possible to identify a user who is allowed to execute the workflow or processes that constitute the workflow. As the configuration information, a series of process functions that constitute the workflow is set. A workflow described in the present exemplary embodiment is assumed to include processes that are performed for a document, and a series of processes for a document is defined such that each process is classified as "input", "processing", or "output". As "input", a process function of inputting document data (hereinafter simply referred to as "document") that is a process target is set. As "processing", a process function that is executed for the input document is set. As "output", a process function of outputting a processing result is set.

FIG. 3 is a diagram illustrating an example data structure of device information stored in the device information storage unit 17 in the present exemplary embodiment. The device information is information regarding devices that request the flow management server 10 to execute workflows and that perform some of the processes included in a workflow as the case may be. In the present exemplary embodiment, devices managed with the device information include the multifunction machine 3, the user terminal 4, and the portable terminal 20. In the device information, a device ID, address information, function information, application information, and user information are set in association with one another for each device. The device ID is identification information about the device. In a case where the device is a portable phone, for example, the International Mobile Equipment Identifier (IMEI) of the device may be used as the device ID. The address information is address information that is used in data communication with the device and is, for example, the Internet Protocol (IP) address of the device. When address information is added to data that is exchanged, the transmission source and the destination of the data are identified. As the function information, information about functions of the device is set. When the device uses its function, a predetermined process is performed. As the application information, information about applications installed in the device is set. Although depending on the model of the device, at least one of the function information or the application information may be included in the device information. As the user information, information regarding a user who uses the device is set. As the user information, for example, a user ID and a user name that serve as identification information about the user and an email address or the like that serves as contact information about the user are set. In a case where the device is shared, the user information may include no information or may include personal information about the administrator.

The user authentication unit 11, the flow list creation unit 12, the device information obtaining unit 13, and the flow execution control unit 14 in the flow management server 10 are implemented by a cooperative operation between the computer that constitutes the flow management server 10 and a program running on the CPU mounted in the computer. The user information storage unit 15, the flow information storage unit 16, and the device information storage unit 17 are implemented as the HDD mounted in the flow management server 10. Alternatively, the RAM may be used or a memory in the intra-company LAN system 1 may be used via the network.

The portable terminal 20 is an example of a device that is used in a case where a user uses a workflow managed by the flow management server 10 from outside the company. In the present exemplary embodiment, although a smartphone is assumed to be the portable terminal 20 and a description is given, for example, a tablet terminal or a portable PC may be used instead of a smartphone. The portable terminal 20 is implemented as an existing general-purpose hardware configuration. That is, the portable terminal 20 includes hardware, such as a CPU, a ROM, a RAM, a liquid crystal touch panel that serves as a user interface, a storage that serves as a memory, and a network interface that serves as a communication unit.

The portable terminal 20 includes a user processing unit 21, a flow execution processing unit 22, a device information transmission unit 23, and an execution result output processing unit 24. Note that a constituent element not described in the present exemplary embodiment is omitted in FIG. 1.

The user processing unit 21 performs a login process and a logout process for the flow management server 10. The flow execution processing unit 22 performs a process for using a workflow managed by the flow management server 10. The device information transmission unit 23 transmits device information regarding the portable terminal 20 in response to a request from the flow management server 10. The execution result output processing unit 24 performs a process for outputting an execution result of a workflow executed under the control of the flow management server 10.

The user processing unit 21, the flow execution processing unit 22, the device information transmission unit 23, and the execution result output processing unit 24 in the portable terminal 20 are implemented by a cooperative operation between the computer that constitutes the portable terminal 20 and a program running on the CPU mounted in the computer.

Any program used in the present exemplary embodiment may be provided via a communication unit as a matter of course or may be stored in a computer-readable recording medium, such as a compact disc read-only memory (CD-ROM) or a Universal Serial Bus (USB) memory, and provided. The program provided via the communication unit or the recording medium is installed in a computer, and a CPU of the computer executes the program step by step to thereby implement various processes.

Figure 4:
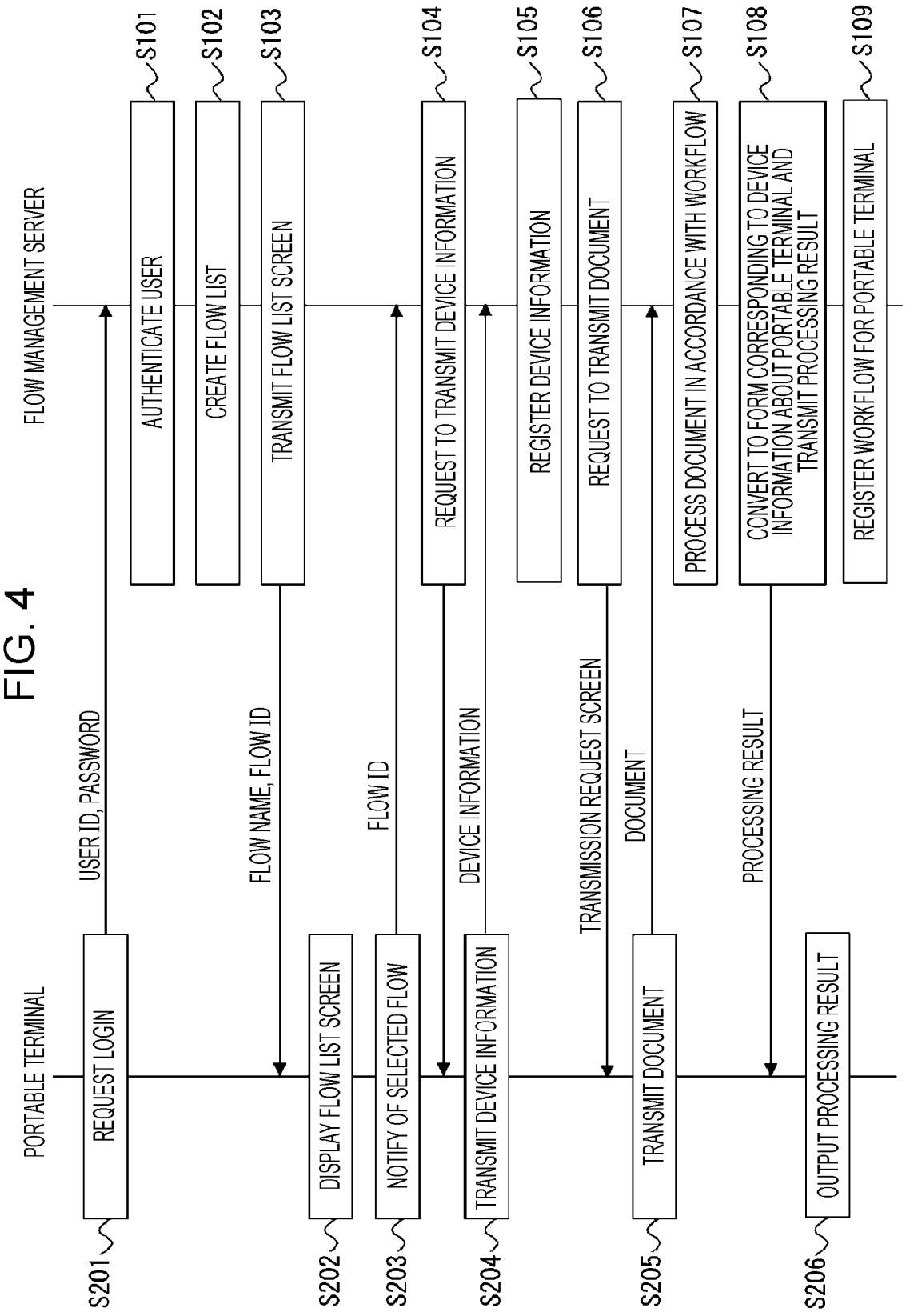
FIG. 4 is a sequence chart illustrating processes that are performed in a case where a user executes a workflow from outside a company by using a portable terminal in the present exemplary embodiment.

Now, an operation in the present exemplary embodiment will be described. One of the characteristics of the present exemplary embodiment is a process that is performed in a case where a user uses the portable terminal 20 to use, from outside the company, a workflow managed by the flow management server 10. In a case where a workflow is executed from the multifunction machine 3 or from the user terminal 4 in the company, existing processes are to be performed, and therefore, a description of such a case will be omitted. The case where a user uses the portable terminal 20 to execute, from outside the company, a workflow will be described below with reference to the sequence chart illustrated in FIG. 4.

A user causes the portable terminal 20 to display a predetermined login screen and makes a login request to the flow management server 10. The user processing unit 21 in the portable terminal 20 transmits a login request that includes a user ID and a password specified on the login screen to the flow management server 10 (step S201).

The user authentication unit 11 in the flow management server 10 performs user authentication with reference to the user information in response to the login request transmitted from the portable terminal 20 (step S101). Here, it is assumed that the user authentication is successfully completed, and the description will be continuously given below.

Subsequently, the flow list creation unit 12 checks privileges granted to the logged-in user for workflows against privilege information set in flow information and identifies workflows for which the user is granted the privilege to execute. The flow list creation unit 12 creates a flow list that includes the flow names of the identified workflows (step S102). The flow list creation unit 12 transmits a flow list screen created accordingly to the portable terminal 20 to display the flow list screen on the portable terminal 20 (step S103). The flow list screen that is transmitted includes the flow names, which are display targets, and flow IDs corresponding to the flow names.

Figure 5:
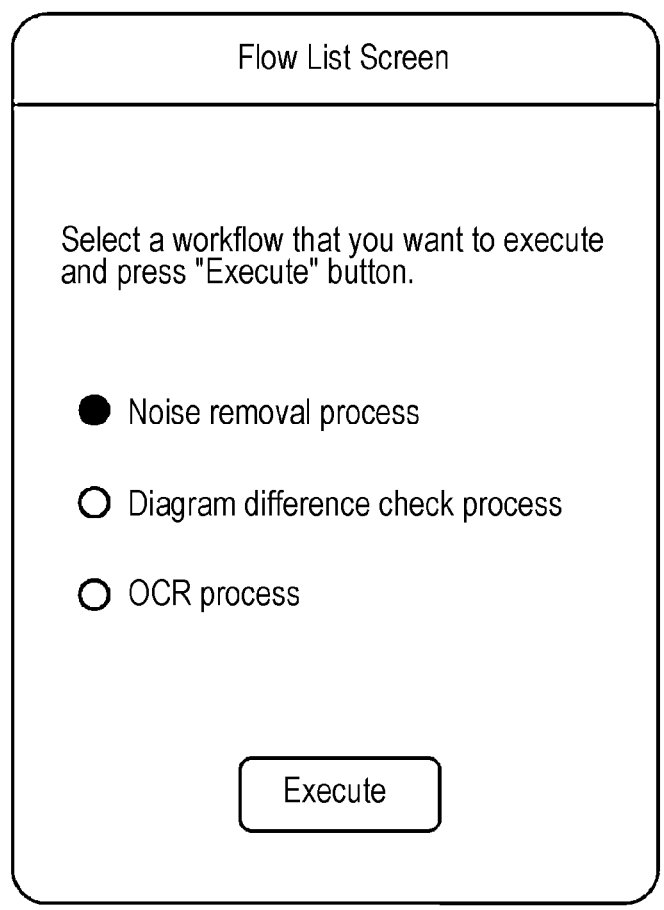
FIG. 5 is a diagram illustrating an example of a flow list screen in the present exemplary embodiment.

In response to receiving the flow list screen, the flow execution processing unit 22 displays the flow list screen on the liquid crystal panel of the portable terminal 20 (step S202). FIG. 5 illustrates an example of the flow list screen in the present exemplary embodiment. In response to the user selecting from the flow list, a workflow that the user wants to execute, the flow execution processing unit 22 notifies the flow management server 10 of the flow ID of the selected workflow (step S203). FIG. 5 illustrates example display in a case where a workflow "noise removal process" is selected.

Subsequently, in response to receiving the flow ID of the user-selected workflow transmitted from the portable terminal 20, the device information obtaining unit 13 requests the portable terminal 20 to transmit device information (step S104). Note that the device information obtaining unit 13 may request the portable terminal 20 to transmit device information related to at least the workflow selected by the user. In a case where information regarding all functions and applications of the portable terminal 20 is to be obtained as device information regardless of the selected workflow, the process for obtaining device information may be performed before selection of a workflow by the user, that is, for example, before the process in step S102.

In response to the transmission request from the flow management server 10, the device information transmission unit 23 in the portable terminal 20 collects and returns device information about the portable terminal 20 (step S204).

In response to receiving the device information transmitted from the portable terminal 20 in response to the transmission request, the device information obtaining unit 13 registers the obtained device information about the portable terminal 20 in the device information storage unit 17 (step S105). Although the device information that is registered in the device information storage unit 17 is transmitted in response to the transmission request from the flow management server 10, the device information may be actively transmitted from the portable terminal 20 without waiting for the transmission request. In a case of actively transmitting the device information, the portable terminal 20 may, for example, transmit the device information together with the flow ID of the flow selected from the flow list in step S203.

In the example screen display illustrated in FIG. 5, the user selects "noise removal process". In the example setting of flow information illustrated in FIG. 2, "input" of "noise removal process" is "scan", and therefore, it is found that the selected workflow is a workflow in which scan data of a document obtained by using a scan function of, for example, the multifunction machine 3 is used as input data.

A scanner is not connected to the portable terminal 20, which is known with reference to the device information, and therefore, it is not possible to use "input" included in the existing "noise removal process" as is. In the present exemplary embodiment, a part (that is, "input") of the existing "noise removal process" selected by the user is replaced with a process corresponding to the device information about the portable terminal 20 to make "noise removal process" executable.

Figure 6:
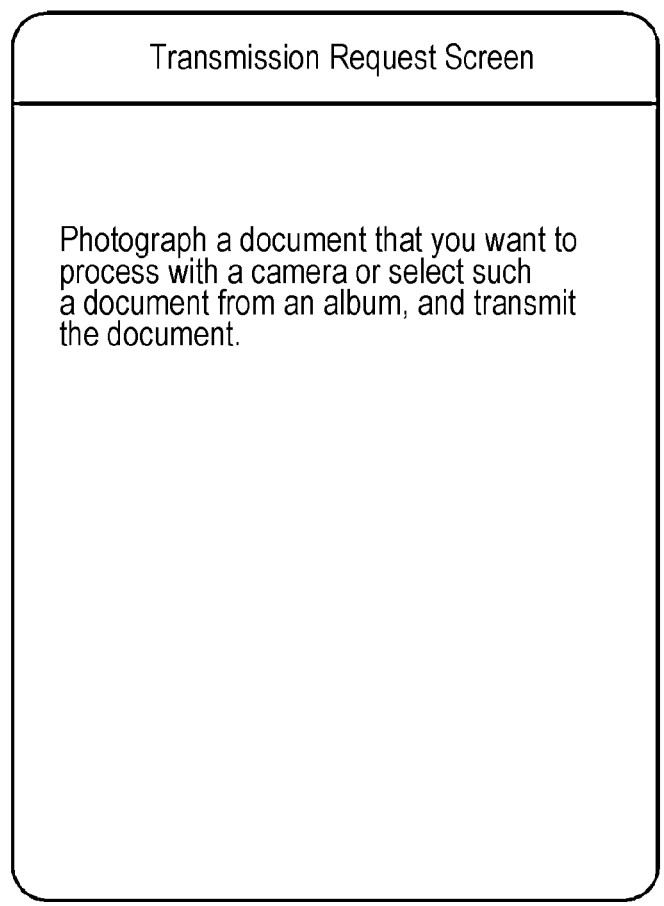
FIG. 6 is a diagram illustrating an example of a transmission request screen for a document in the present exemplary embodiment.

The flow execution control unit 14 recognizes that the portable terminal 20 has a camera function and a file transmission function with reference to the device information about the portable terminal 20 and requests the portable terminal 20 to transmit a document (step S106), which is a process that replaces "scan" set as "input" of the workflow. In the present exemplary embodiment, the flow execution control unit 14 transmits a transmission request screen for a document to the portable terminal 20 to display the transmission request screen on the portable terminal 20. FIG. 6 illustrates an example of the transmission request screen displayed on the liquid crystal panel of the portable terminal 20 in this case.

The flow execution processing unit 22 returns a process target document in response to the transmission request from the flow management server 10 (step S205).

As described above, in the present exemplary embodiment, a process that replaces the process already set in the workflow is identified with reference to the device information about the portable terminal 20, and the "input" process that is implemented with the identified process is performed.

In response to obtaining the process target document, the flow execution control unit 14 performs for the document, a process set as "processing" in the workflow by itself or in cooperation with other devices (step S107). The process set as "processing" is basically performed by using functions of the intra-company LAN system 1, and therefore, it is possible to perform the process set as "processing" as is. However, in a case where, for example, a device that performs the "output" process included in the workflow is placed outside the company, the device may be unable to perform output as requested by the workflow.

For example, it is assumed that "output" in the workflow is "print" and that a device to which a processing result is delivered has a print function. In a case where creation of print data having a resolution of 4800 dpi is set as "processing" in the workflow and the upper limit of the resolution of a printer outside the company is 600 dpi, the printer to which the processing result is delivered is unable to perform the process if the existing workflow remains unchanged. Therefore, the process of creating print data set as "processing" may be replaced with a process of creating print data having a resolution of 600 dpi. As described above, even when it is possible to perform the process set as "processing" in the workflow as is, in the present exemplary embodiment, a part (that is, "processing") of the workflow may be replaced in accordance with the capability of the device to which the processing result is delivered.

In response to completion of "processing" in the workflow, the flow execution control unit 14 performs the "output" process, in the workflow, of outputting the processing result. The flow execution control unit 14 in the present exemplary embodiment refers to the device information about the portable terminal 20 and performs a process as described below to determine a destination to which the processing result is to be delivered and the form of the processing result.

In the existing "noise removal process", "output" is "print". Therefore, when "output" in "noise removal process" is performed as usual, a destination to which the processing result, that is, print data, is delivered is the multifunction machine 3 in the intra-company LAN system 1, and the multifunction machine 3 is caused to perform the print process. However, in a case where the portable terminal 20 is not connected to the intra-company LAN system 1 to which the multifunction machine 3 is connected as in this example, "print" set as "output" in "noise removal process" is not to be processed as usual but is to be replaced. That is, the flow execution control unit 14 replaces a process of transmitting the processing result to the multifunction machine 3 with a process of transmitting the processing result to the portable terminal 20.

Subsequently, in a case where a printer is placed at a location, such as a home, where the portable terminal 20 is used and an application having a print function of printing at the printer is installed in the portable terminal 20, that is, in a case where it is possible to use a printer outside the intra-company LAN system 1, the flow execution control unit 14 converts, as appropriate, the print data to a format (for example, a Portable Document Format (PDF) document) that can be processed by the portable terminal 20 and the printer, and transmits the converted print data to the portable terminal 20 as the processing result by, for example, attaching the print data to an email as an attached document (step S108). That is, the flow execution control unit 14 replaces the process of causing the multifunction machine 3 to print the print data with a process of transmitting to the portable terminal 20 the print data converted to the format that can be provided to the user as described above. "Format that can be provided to the user" refers to a format that can be processed, saved, and viewed by the portable terminal 20.

In a case where an application having the print function is not installed in the portable terminal 20 but an application having a network print function, such as netprint (registered trademark), is installed therein, the flow execution control unit 14 makes a request to a confirmation number issuing source to obtain a confirmation number to be used in printing of the print data that is an output target. The flow execution control unit 14 identifies a document format that can be viewed on the portable terminal 20 on the basis of applications installed in the portable terminal 20. In a case where the portable terminal 20 is able to process plural document formats, the flow execution control unit 14 may identify a document format to which the print data is converted, in accordance with priority levels set in advance. The flow execution control unit 14 converts the print data to the document format as appropriate and transmits the converted print data to the portable terminal 20 as the processing result together with the confirmation number (step S108). That is, the flow execution control unit 14 replaces the process of causing the multifunction machine 3 to print the print data to a process of transmitting to the portable terminal 20 the print data in the document format that can be provided to the user as described above and the confirmation number as the processing result. Also in this case, an email may be used to transmit the processing result.

As described above, in a case where the portable terminal 20 is able to use a printer outside the intra-company LAN system 1, when the portable terminal 20 has the print function, the flow execution control unit 14 replaces the existing process with the process of transmitting the print data to the portable terminal 20 as information to be used in printing at the printer, and when the portable terminal 20 does not have the print function, the flow execution control unit 14 replaces the existing process to the process of obtaining a confirmation number and transmitting the confirmation number to the portable terminal 20 together with the print data.

Note that for the user terminal 4, replacement with the above-described process is not performed. In a case where the portable terminal 20 is taken into the company and is connected to the intra-company LAN system 1, the portable terminal 20 can be treated similarly to the user terminal 4. Therefore, in a case where the portable terminal 20 executes the workflow within the company, the flow execution control unit 14 does not perform the above-described process replacement.

In response to obtaining the processing result of the workflow transmitted from the flow management server 10, the execution result output processing unit 24 in the portable terminal 20 performs a process corresponding to the form of the transmitted processing result to thereby output the print data that is the processing result (step S206). That is, in response to receiving an email, the execution result output processing unit 24 uses its print function to cause the printer to print the print data attached to the email. In a case where a confirmation number is added to the print data, the execution result output processing unit 24 uses its network print function to print the print data by using a multifunction copy machine placed in a nearby shop, such as a convenience store. Even in a case where there is no nearby shop or there is no time to go to a shop, the user can view a document corresponding to the print data because the print data in a document format that can be viewed on the portable terminal 20 has been created.

Note that the above description is given under the assumption that a file, such as print data, that is a processing result can be successfully transmitted from the flow management server 10 to the portable terminal 20. However, the flow management server 10 and the portable terminal 20 might not be kept connected to the network during execution of the workflow. That is, the flow management server 10 and the portable terminal 20 might not be connected to the network at the time when the process in step S108 is performed. Therefore, in accordance with the network connection relationship between the flow management server 10 and the portable terminal 20, the flow execution control unit 14 may determine whether to replace the "output" process that is a part of the workflow and perform transmission as described above, or not to replace the "output" process.

An example case where the existing process is replaced with the process of transmitting a file, such as print data, that is the processing result from the flow management server 10 to the portable terminal 20 has been described above. However, the replacement process is not to be limited to the process of file transmission. For example, in a case where the volume of a file created as a result of processing is excessively large and where the network load or the storage capacity of the portable terminal 20 is taken into consideration, it may be better not to transmit the file. In this case, the flow execution control unit 14 may store the created file in a predetermined storage location in the intra-company LAN system 1 and notify the portable terminal 20 of the storage location in step S108 as the processing result. In this case, the user of the portable terminal 20 may obtain the file when the user comes to the office.

Although "output" is assumed to be a part of the workflow here, it may be determined whether or not to replace a process set as "input" or "processing", in accordance with the network connection relationship between the flow management server 10 and the portable terminal 20.

As described above, according to the present exemplary embodiment, even in a case where it is not possible to externally use an existing workflow as is, the entire workflow or a part of the workflow is replaced by a process that can be externally used to make the workflow executable. Therefore, the existing workflow is changed and used so as to be adapted to the environment in which the portable terminal 20 uses the workflow.

As described above, the flow execution control unit 14 replaces some of the processes in the existing workflow "noise removal process" so as to be executable by the portable terminal 20. The flow execution control unit 14 creates flow information regarding the workflow created by process replacement and registers the flow information in the flow information storage unit 16 (step S109). In other words, according to the present exemplary embodiment, a workflow for the portable terminal 20 is created from an existing workflow, that is, an already created workflow. Once the workflow for the portable terminal 20 has been thus created, in a case where the user wants to execute the workflow, the user uses the workflow for the portable terminal 20 retained on the flow management server 10 by selecting the workflow for the portable terminal 20 from the flow list (steps S202 and S203).

Note that to the flow information corresponding to the workflow for the portable terminal 20, information indicating that the workflow is for external use, the user ID of the user for which the workflow is created or the device ID of the portable terminal 20, device information about the portable terminal 20, and so on may be linked and managed. Accordingly, the workflow for the portable terminal 20 may be used not only by the user for which the workflow is created but also from a device having an internal environment equivalent to that of the portable terminal 20, that is, a device having functions and applications the same as or similar to those of the portable terminal 20.

The flow execution processing unit 22 may display a workflow created for the portable terminal 20 so as to be distinguishable from other workflows on the flow list displayed on the screen to thereby allow the user to find the flow for the portable terminal 20.

In the present exemplary embodiment, in response to the user selecting the workflow "noise removal process", a workflow "noise removal process" adapted to the portable terminal 20 is created. Meanwhile, the user may subsequently select a workflow other than "noise removal process". Therefore, the case where the user selects a workflow other than "noise removal process" is assumed, and a workflow corresponding to the other workflow, such as "diagram difference check process" or "OCR process", and adapted to the portable terminal 20 may be created in advance and prepared before selection by the user. It is possible to create the workflow corresponding to the other workflow and adapted to the portable terminal 20 with reference to device information about the portable terminal 20. Although device information about the external device is retained and managed in the intra-company LAN system 1 in step S105 illustrated in FIG. 4, the internal environment of the external device, that is, functions or applications installed in the external device, may be updated, and therefore, a process may be performed to update the device information as appropriate.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor configured to:
    display on a first device a flow list of flows that each include a series of processes and that have already been created for a second device;
    receive a selection of a flow by a user using the first device;
    create a new flow for the first device by replacing a process in the selected flow by determining that the first device does not have a function to perform the replaced process while the second device has the function 1 with a process corresponding to device information set for the first device;
    determine whether or not to replace the process in the flow, in accordance with a network connection relationship between the first device and the information processing apparatus; and
    in a case where the process in the flow is a print process of causing a printer to print an execution result of the flow, the printer being connected to a local network to which the information processing apparatus is connected, and the first device is not connected to the local network, replace the process in the flow with a process of transmitting the execution result of the flow to the first device.

2. The information processing apparatus according to claim 1, wherein the device information includes information about at least one of a function or an application set in the first device.

3. The information processing apparatus according to claim 2, wherein the processor is configured to obtain the device information from the first device in response to the user selecting the flow.

4. The information processing apparatus according to claim 1, wherein the processor is configured to obtain the device information from the first device in response to the user selecting the flow.

5. The information processing apparatus according to claim 1, wherein in a case where the device is able to use a printer outside the local network, the processor is configured to replace the process in the flow with a process of transmitting to the first device, information to be used to cause the printer outside the local network to print the execution result of the flow.

6. The information processing apparatus according to claim 1, wherein the processor is configured to replace the process in the flow with a process of transmitting to the first device, the execution result of the flow in a format with which an application set in the first device is able to provide the execution result to the user.

7. The information processing apparatus according to claim 1, wherein in a case where the first device is connected to the local network, the processor is configured not to replace the process in the flow.

8. The information processing apparatus according to claim 1, wherein the processor is configured to retain in a memory the created flow for the first device.

9. The information processing apparatus according to claim 8, wherein the processor is configured to display the flow for the first device included in the flow list on the device in a distinguishable manner.

10. The information processing apparatus according to claim 8, wherein the processor is configured to create a flow for the first device by replacing a process in a flow other than the flow selected by the user from the flow list, the process being identical to the process in the flow selected by the user, with a process corresponding to the device information.

11. A non-transitory computer readable medium storing a program causing a computer to execute a process, the process comprising: displaying on a first device a flow list of flows that each include a series of processes and that have already been created for a second device; receiving a selection of a flow by a user using the first device; creating a new flow for the first device by replacing a process in the selected flow by determining that the first device does not have a function to perform the replaced process while the second device has the function with a process corresponding to device information set for the first device; determining whether or not to replace the process in the flow, in accordance with a network connection relationship between the first device and the computer and in a case where the process in the flow is a print process of causing a printer to print an execution result of the flow, the printer being connected to a local network to which the computer is connected, and where the first device is not connected to the local network, replacing the process in the flow with a process of transmitting the execution result of the flow to the first device.

12. An information processing method comprising:
    displaying on a first device a flow list of flows that each include a series of processes and that have already been created for a second device;
    receiving a selection of a flow by a user using the first device;
    creating a new flow for the first device by replacing a process in the selected flow by determining that the first device does not have a function to perform the replaced process while the second device has the function with a process corresponding to device information set for the first device;
    determining whether or not to replace the process in the flow, in accordance with a network connection relationship between the first device and an information processing apparatus; and
    in a case where the process in the flow is a print process of causing a printer to print an execution result of the flow, the printer being connected to a local network to which the information processing apparatus is connected, and the first device is not connected to the local network, replacing the process in the flow with a process of transmitting the execution result of the flow to the first device.

* * * * *